H. ENOCH & G. M. POINT.
EMERGENCY VALVE ATTACHMENT FOR AIR BRAKE SYSTEMS.
APPLICATION FILED AUG. 21, 1915.
1,164,709.
Patented Dec. 21, 1915.
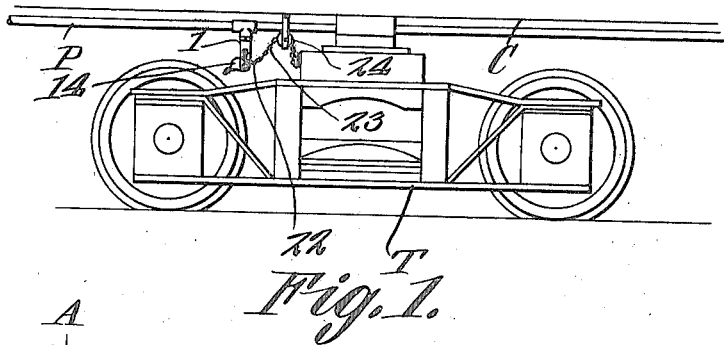
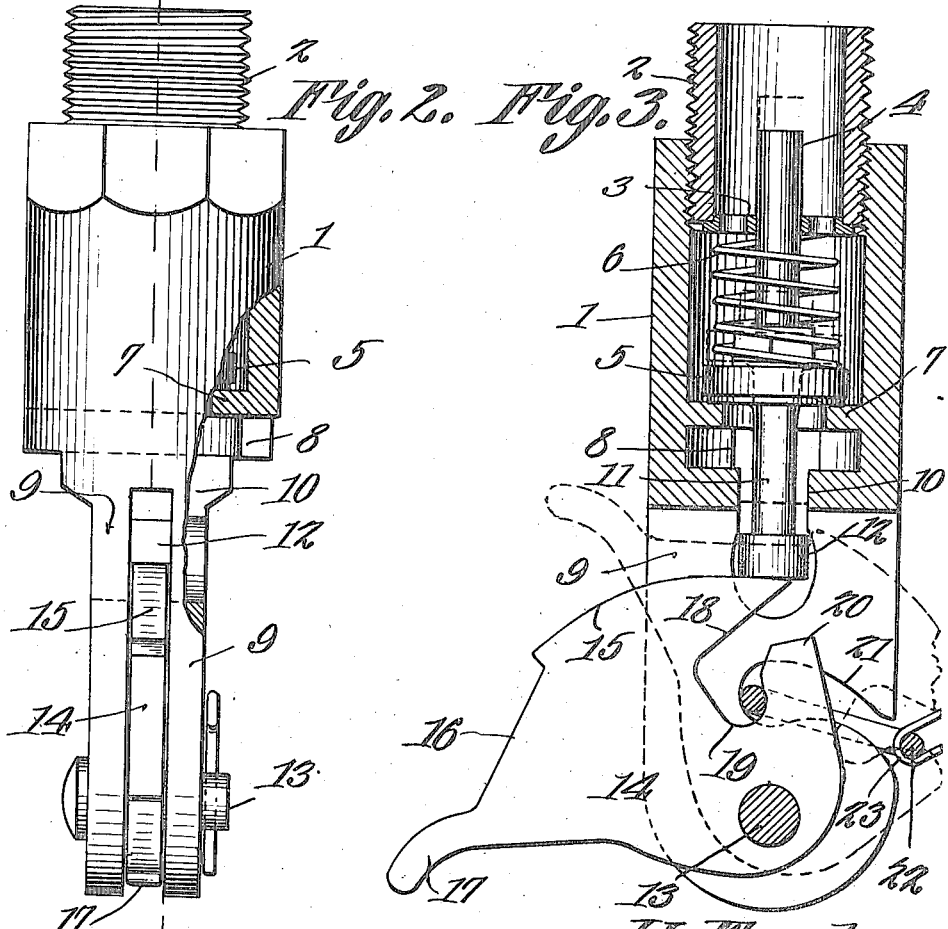
Witnesses
F. B. Wooden
R. L. Parker
H. Enoch and
G. M. Point
Inventors,
by C. A. Snow & Co.
Attorneys.

UNITED STATES PATENT OFFICE.

HARRY ENOCH AND GEORGE M. POINT, OF HUNTINGTON, WEST VIRGINIA.

EMERGENCY-VALVE ATTACHMENT FOR AIR-BRAKE SYSTEMS.

1,164,709.　　　　　　Specification of Letters Patent.　　Patented Dec. 21, 1915.

Application filed August 21, 1915.　Serial No. 46,652.

*To all whom it may concern:*

Be it known that we, HARRY ENOCH and GEORGE M. POINT, citizens of the United States, residing at Huntington, in the county of Cabell, State of West Virginia, have invented a new and useful Emergency-Valve Attachment for Air-Brake Systems, of which the following is a specification.

This invention relates to an emergency attachment for air brake systems, one of the objects of the invention being to provide a simple form of attachment which can be applied readily to systems already in use and which will operate automatically to apply the brakes when the car body and truck attain an objectionable relative movement such as might be produced by the car body leaving the truck or by the truck dropping or sagging from the body.

A further object is to provide a novel form of valve operating means for releasing the air in the line pipe of the air brake system said mechanism being adapted to lock automatically when the valve is opened so that the brakes will remain applied until the parts are readjusted.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing the preferred form of the invention has been shown.

In said drawing:—Figure 1 is a side elevation of a portion of a car having the present improvement combined therewith. Fig. 2 is a view partly in elevation and partly in section of the attachment. Fig. 3 is a section on the line A—B Fig. 6.

Referring to the figures by characters of reference C designates a portion of a car body mounted on a truck T, there being a line pipe P extending along the car and forming a part of an air brake system.

The present invention comprises a valve casing 1 having a threaded nipple 2 extending from one end and which nipple is connected to the pipe P so as to establish communication between said pipe and the interior of the casing 1. An apertured disk 3 is seated against the inner end of the nipple 2 and constitutes a guide for a stem 4 projecting from a valve 5. A spring 6 extends around the stem and bears at one end against the disk 3 and at its other end against the valve 5, the disk 3 serving to hold the valve normally pressed upon a seat 7 formed in the lower portion of the casing 1, thus normally preventing the escape of air through casing 1 from the pipe P. Laterally extending outlet openings 8 are formed in the casing below the seat 7 and extending from the casing are spaced arms 9. An opening 10 is formed in the end of the casing and communicates with the space between the arms 9, this opening receiving a stem 11 projecting from the valve 5 and having an enlargement 12 at its free end. This enlargement is adapted to work within the opening 10, thus to coöperate with the stem 4 and disk 3 in properly guiding the valve 5 to and from its seat.

The arms 9 are provided, near their free ends, with a pivot pin 13 on which is mounted a cam 14 having an eccentric lifting edge 15 in the highest portion of which is formed a recess 16. A tongue 17 extends from the cam close to the recess 16. In the opposed portions of the cam is a slot 18 having a downwardly extending inner end portion 19 so that a tongue 20 is thus formed and which tongue extends substantially radially relative to the pin 13. An arcuate slot 21 is formed in each of the arms 9 and tongue 20 is adapted to extend across the base between the two slots 21. When the cam 14 is in position with the lowest portion of its lifting edge in contact with the enlargement 12 on stem 11, the tongue 20 extends across spaces between parts 21 and is adapted to engage and retain ring 22. To this ring is connected a chain 23 or other suitable flexible element which is guided over a pulley 24 or the like suitably connected to the car C and said connection is also attached to a portion of the truck T. This flexible connection is normally slack so that a limited movement of the car body C and truck T relative to each other is permitted. However when such relative movement becomes excessive, as would be the case should the truck be torn from the body, the connection 23 will be drawn taut and will pull through the ring 22 upon the tongue 20. Consequently the tongue 14 will be swung by its pivot and the lifting edge 15 will work upon the enlargement 12 and push the valve 5 upwardly onto the seat. This operation will continue until enlargement 12 has become seated in the recess 16 whereupon the ring 22 will be released and drop from the slot 21 and tongue 20. The parts will therefore be locked together, the valve remaining open and permitting the air in the pipe P to escape, thus causing the brakes to be applied automatically. The air released by the opening of the valve will issue through the opening 8. Obviously the valve cannot again be closed until after the valve has been lifted so as to remove enlargement 12 from recess 16 whereupon the cam 14 can be swung back into the position shown in Fig. 3, the ring 22 being first placed in engagement with tongue 20 so as to enter slot 21 and be held in engagement with the tongue 20 and the arms 9.

What is claimed is:—

1. The combination with a car having a line pipe of an air brake system, of a valve casing extending from and communicating with said pipe, a spring controlled valve in the casing in normally closed position, a lifting cam connected to the casing, a stem projecting from the valve and normally engaging the cam, and normally slack flexible means connected to the cam and to the truck of the car for shifting the cam to open the valve during excessive relative movement of the car body and truck, said cam having a recess for the reception of the stem to lock the valve in open position.

2. An attachment for air brake systems including a valve casing, said casing having an air inlet and an air outlet, a valve normally closing the outlet, a stem extending from the valve, slotted members projecting from the casing, a lifting cam pivotally mounted between said members and normally engaging the stem, said lifting cam having a tongue normally extended across the slots, and a flexible actuating member detachably engaging the tongue and movable from the slots, said member constituting means for attachment to the truck of a car.

3. An attachment for air brake systems including a valve casing, said casing having an air inlet and an air outlet, a valve normally closing the outlet, a stem extending from the valve, slotted members projecting from the casing, a lifting cam pivotally mounted between said members and normally engaging the stem, said lifting cam having a tongue normally extended across the slots, and a flexible actuating member detachably engaging the tongue and movable from the slots, said member constituting means for attachment to the truck of a car, there being a recess in the arcuate portion of the cam for the reception of the stem when the valve is unseated, thereby to lock the valve in open position.

In testimony that we claim the foregoing as our own, we have hereto affixed our signatures in the presence of two witnesses.

HARRY ENOCH.
GEORGE M. POINT.

Witnesses:
S. M. CARROLL,
C. W. BUFFINGTON.